US009451119B2

(12) United States Patent
Lee et al.

(10) Patent No.: US 9,451,119 B2
(45) Date of Patent: Sep. 20, 2016

(54) ELECTRONIC DEVICE AND METHOD FOR SYNTHESIZING IMAGE WITH SOUND SUITABLY USING THE SAME

(71) Applicant: Samsung Electronics Co., Ltd., Gyeonggi-do (KR)

(72) Inventors: Kihuk Lee, Gyeonggi-do (KR); Hyunjung Kim, Seoul (KR); Myungjung Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 73 days.

(21) Appl. No.: 14/487,402

(22) Filed: Sep. 16, 2014

(65) Prior Publication Data

US 2015/0092081 A1     Apr. 2, 2015

(30) Foreign Application Priority Data

Sep. 27, 2013   (KR) .................. 10-2013-0114916

(51) Int. Cl.
  *H04N 5/272*   (2006.01)
  *H04N 5/76*    (2006.01)
  *H04N 1/21*    (2006.01)
  *G06F 17/30*   (2006.01)

(52) U.S. Cl.
  CPC ........ *H04N 1/212* (2013.01); *G06F 17/30259* (2013.01); *G06F 17/30752* (2013.01); *H04N 1/2125* (2013.01)

(58) Field of Classification Search
  CPC ............................................... H04N 2201/3264
  USPC .......................................... 348/231.99, 231.4
  See application file for complete search history.

(56) References Cited

U.S. PATENT DOCUMENTS

| 6,556,775 B1 * | 4/2003 | Shimada ................ H04N 5/272 348/E5.058 |
| 2006/0061671 A1 * | 3/2006 | Kitsugi .............. H04N 1/00411 348/231.99 |
| 2007/0081796 A1 | 4/2007 | Fredlund et al. |

* cited by examiner

*Primary Examiner* — Joel Fosselman
(74) *Attorney, Agent, or Firm* — Cha & Reiter, LLC.

(57) ABSTRACT

An apparatus and a method for photographing an image in an electronic device having a camera are disclosed. The electronic device may include an image sensor, an image signal processor configured to process an image obtained by the image sensor, an audio processing unit configured to process a sound received from a microphone, a storage unit configured to store data, and a control unit configured to implement the method. The method may include recording for a set period of time, a series of images and a series of sounds using the image sensor and the microphone when a sound photographing mode is active, selecting a particular sound from the series of sounds having a high correlation with a particular image from the series of images, and synthesizing the particular sound with the particular image and store in the storage unit the synthesized particular sound with the particular image.

18 Claims, 18 Drawing Sheets

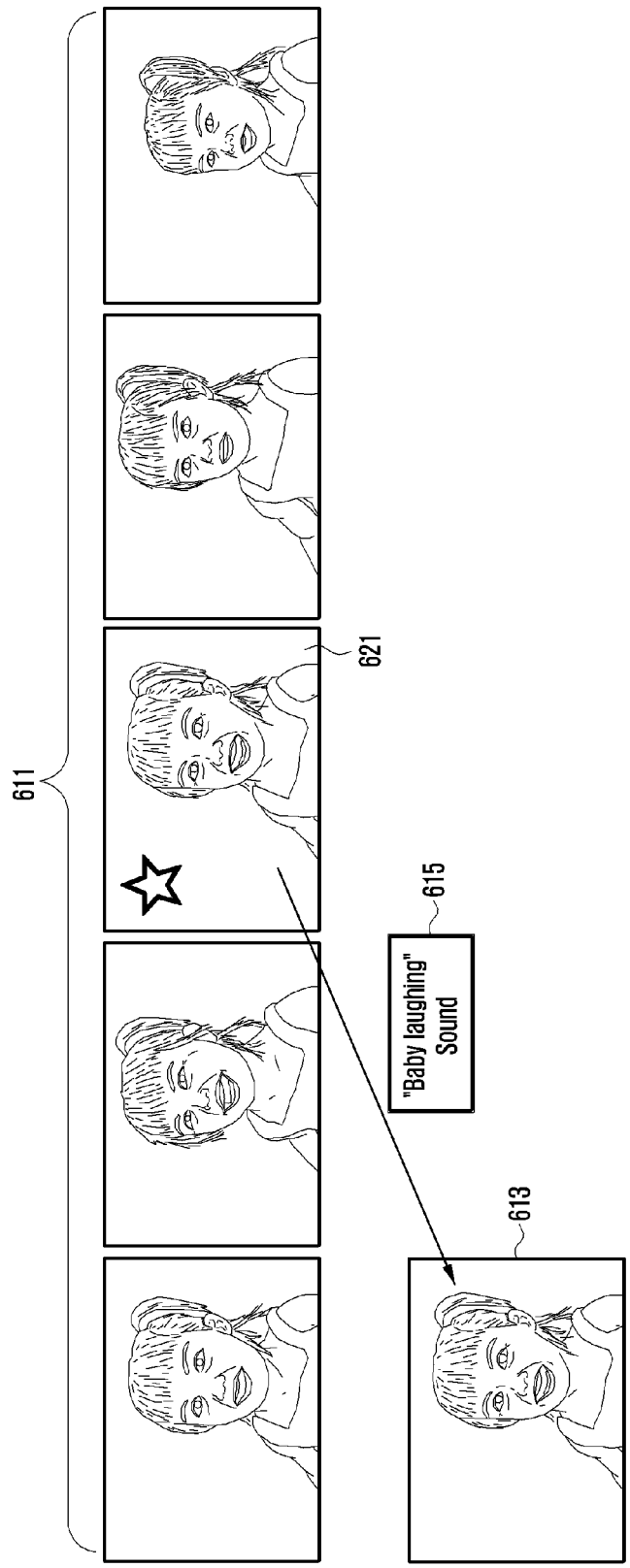

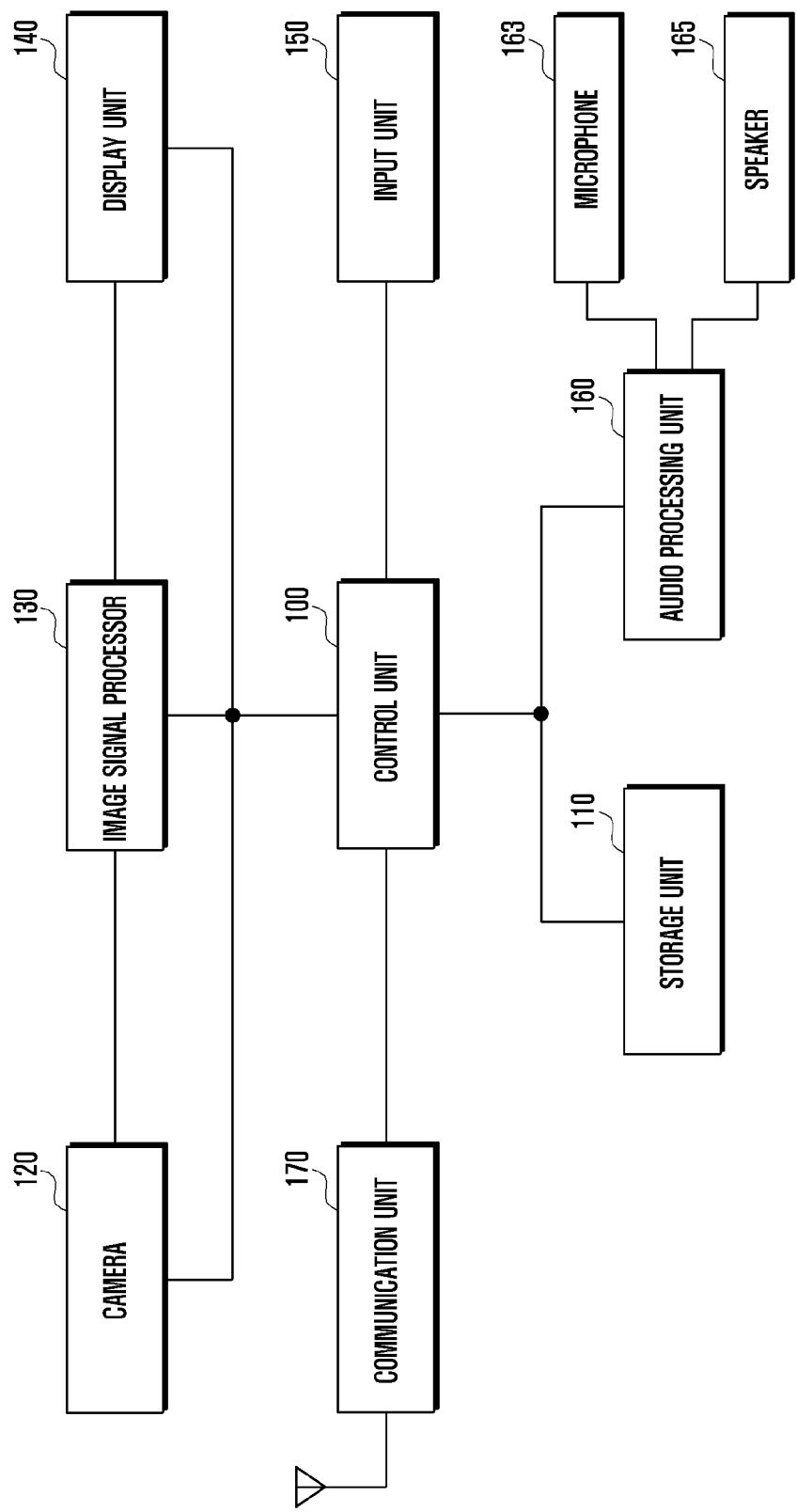

ELECTRONIC DEVICE AND METHOD FOR SYNTHESIZING IMAGE WITH SOUND SUITABLY USING THE SAME

CLAIM OF PRIORITY

This application claims the benefit under 35 U.S.C. §119(a) of a Korean patent application filed on Sep. 27, 2013 in the Korean Intellectual Property Office and assigned Serial No. 10-2013-0114916, the entire disclosure of which is hereby incorporated by reference.

TECHNICAL FIELD

The present disclosure relates to an apparatus and a method for photographing an image in an electronic device having a camera.

BACKGROUND

An electronic device having a camera can photograph a still or moving image in various methods. For example, the camera device can insert additional information in a photographed image. The additional information may be information related to a photographing location and/or environment. For this, a voice can be recorded with an image when photographing a still image.

A method for recording a sound when photographing a still image is performed by taking a still image and recording a sound at the same time. In case of taking a still image including a sound in a camera device, a mismatch between the photographed image and the recorded sound can happen. For example, when photographing an image in a situation of a laughing person, a laughing sound may be recorded but an image of a frown or expressionless face could be taken.

Accordingly, it is desirable to match a sound with a photographing environment when photographing a still image with a camera device or an electronic device having a camera.

SUMMARY

Aspects of the present disclosure are to address at least the above mentioned problems and/or disadvantages to provide at least advantages described below.

An aspect of the present disclosure provides an apparatus and a method for storing a still image with a sound by recording the sound when photographing the image in a camera device, analyzing the still image, and selecting a sound having a mood matched with the analyzed still image.

Another aspect of the present disclosure provides an apparatus and a method for storing a still image with a sound by recording the sound when photographing the image in a camera device, analyzing the recorded sound, and selecting an image having a mood matched with the analyzed sound.

In accordance with an aspect of the present disclosure, a method for photographing an image in an electronic device having a camera is disclosed. The method includes recording, for a set period of time, a series of images and a series of sounds using the camera and the microphone when a sound photographing mode is active, selecting a particular sound from the series of sounds having a high correlation with a particular image from the series of images, and synthesizing the particular sound with the particular image and storing the synthesized particular sound with the particular image.

In accordance with another aspect of the present disclosure, an apparatus or electronic device for photographing an image in an electronic device having a camera is disclosed. The apparatus or electronic device may include an image sensor, an image signal processor configured to process an image obtained by the image sensor, an audio processing unit configured to process a sound received from a microphone, a storage unit configured to store data, and a control unit configured to implement the method. The method may include recording for a set period of time, a series of images and a series of sounds using the image sensor and the microphone when a sound photographing mode is active, selecting a particular sound from the series of sounds having a high correlation with a particular image from the series of images, and synthesizing the particular sound with the particular image and store in the storage unit the synthesized particular sound with the particular image.

BRIEF DESCRIPTION OF THE DRAWINGS

The above and other aspects, features, and advantages of certain embodiment of the present disclosure will be more apparent from the following description taken in conjunction with the accompanying drawings, in which:

FIG. 6A, FIG. 6B and FIG. 6C are drawings illustrating examples of which a plurality of images selected in sound photographing is recorded at the same time of recording a sound, and the image and sound are stored after selecting a sound having a high correlation with the image;

FIG. 11 is a block diagram illustrating a configuration of electronic device performing a photographing operation according to an embodiment of the present disclosure.

DETAILED DESCRIPTION

Figure 1:
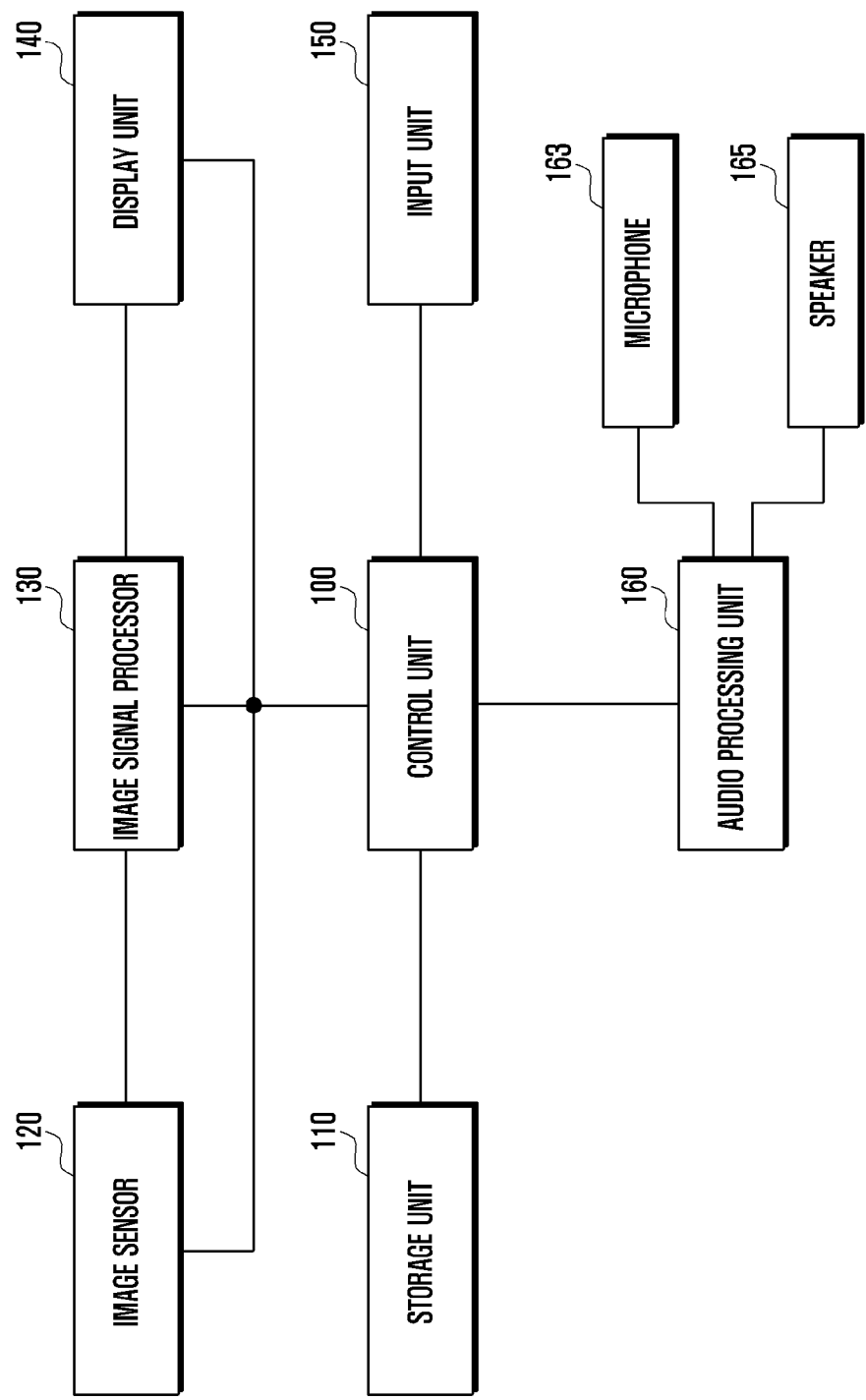
FIG. 1 is a block diagram illustrating a configuration of camera device.

Hereinafter, embodiments of the disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure.

For the same reasons, some components in the accompanying drawings are emphasized, omitted, or schematically illustrated, and the size of each component does not fully reflect the actual size. Therefore, the present invention is not limited to the relative sizes and distances illustrated in the accompanying drawings.

An electronic device having a camera or a camera device (hereafter, called camera device) provides various photographing modes according to the development in digital processing technologies. A sound photographing mode (e.g., a "sound and shot" mode) may be one of the photographing modes. The "sound photographing" mode means a mode for recording a still image together with a sound. Namely, the sound photographing mode stores one frame image selected from a sequence of frame images and stores a sound or a voice recorded for a predetermined time. Here, the image and sound may be stored in a single file. The file stored in the sound photographing mode may be configured with an image header, image body, and image tail. The image header may store information such as storing locations and sizes of corresponding image and sound. The image body may store still image data and the image tail may store sound data as additional information. Here, the image header and body can be decided according to an image processing method (such as, for example, encoding and decoding).

The sound photographing mode can be performed in various methods. For example, a method for recording an image with a sound may be performed in two steps, including initiating recording of a sound when the sound photographing mode is activated, obtaining an image at the time of activation and continuing to record the sound for a predetermined time. Namely, the sound photographing mode is a method for storing a still image together with a sound by recording the sound for a predetermined time before and after the time of photographing the image.

Another example method might include continuously storing a sound in a first-in-first-out memory without a specific start signal for recording a sound, and to store an image with the sound by selecting a portion of the sound recorded starting at a predetermined time period before and predetermined time period after the receiving of a user's command to capture an image photograph. Namely, in the sound photographing mode, the camera device buffers a sound, obtains an image, and stores the image with a portion of the sound by selecting a sound selection from the sound buffered for a predetermined time period before and after the time of obtaining the image.

When storing an image together with a sound in the sound photographing mode, the stored image may be a still image. In this case, it is desirable to express the image by matching with a sound having the closest feeling (emotion). Namely, the image stored in the sound photographing mode is a still image, whereas the sound includes data continuously recorded for a predetermined time. Therefore, there can be a limit to store the attribute of continuous sound data with the still image. For example, when photographing a laughing person with a loud voice, a mismatched combination of a smiling face and a loud voice could be captured, if the picture is not taken precise at the moment of laughter. Further, a highlight of the sound and the highlight of the image may be mistimed. For example, when photographing a scene of firecrackers, the highlight of sound may be the moment of a firecracker explosion, but the highlight of the image may be the moment of the firecracker merely expanding in the air before the full explosion.

Accordingly, it is desirable to store the photographed image and recorded sound by reconciling the attributes of these captured images and sounds. Various embodiments of the present disclosure suggest methods for storing an image and a sound by reconciling the attributes of image and sound in a sound photographing mode.

Firstly, a single file can be generated by analyzing an image taken by a camera device and selecting a sound related to the image. For this, the camera device buffers a sound for a predetermined time in the sound photographing mode and buffers still images by continuously photographing. Subsequently, at least one still image is selected. The camera device analyzes the attribute of the selected still image, sets a buffering section of sound having an attribute identical to that of the selected still image, and stores the selected still image together with the sound corresponding to the set buffering section. Here, the still image can be selected by the camera device automatically or by a user.

A method for detecting a sound harmonized with the image can be performed by storing sounds and still images continuously recorded for predetermined time. Subsequently, the camera device analyzes and classifies the still images, analyzes the sound recorded at the time of photographing the still image, and detects a factor satisfying the condition of the classified image. According to the result of detecting the sound, the camera device sets a buffering section suitable for the still image and stores sound data.

Secondly, the camera device can generate a single file by analyzing a buffered sound and selecting an image having an attribute identical to that of the sound. For this, the camera device buffers a sound for a predetermined time in the sound photographing mode and buffers still images by continuously photographing. Subsequently, the camera device analyzes the buffered sound, selects a still image having an attribute identical to that of the sound, and stores the selected image together with the sound.

FIG. 1 is a block diagram illustrating a configuration of camera device.

Referring to FIG. 1, an image sensor 120 detects and outputs an image by converting an electric signal to digital data in a photographing mode. The image sensor 120 may be configured with a dual image sensor. In this case, a first image sensor may be installed at, for example, the rear side of the device, and a second image sensor may be installed, for example, in the front bezel area of the device. The first image sensor may have a higher resolution than the second image sensor. The first and second image sensors may be driven independently of one another, or simultaneously, under the control of a control unit 100. The image sensor 120 can photograph a still or moving image according to the control of the control unit 100.

An image signal processor 130 processes an image output by the image sensor 120. The image signal processor 130 may be configured with a pre-processor, post-processor, scaler, and codec (coder and/or decoder). The image signal processor 130 pre-processes and post-processes the image output by the image sensor 120 and outputs the processed image to a display unit 140 by resizing into a size suitable to display in the display unit 140. Further, the image signal processor 130 can compress and encode the image processed under the control of the control unit 100 in the photographing mode (image capture mode or image shot mode). The image signal processor 130 may include a buffer for temporarily storing photographed still images. The buffer may be configured with a ring buffer having a size large enough to store a predetermined number of frame images. Further, the image signal processor 130 may be installed independently as shown in FIG. 1 or may be integrated into the control unit 100.

The control unit 100 controls general operations of the camera device. The control unit 100 controls the image sensor 120 to continuously photograph and buffer still images in the sound photographing mode and controls an audio processing unit 160 to buffer a sound input through a microphone 163 for a predetermined time. Further, the control unit 100 may include an image recognizer and a sound recognizer, and can perform a function of storing matched image and sound in a single file by analyzing the attributes of the image and sound in the sound photographing mode. If the image sensor is configured with a dual sensor, the control unit 100 can controls the first image sensor and/or the second image sensor respectively or simultaneously. Further, the control unit 100 may integrate the image signal processor 130.

A storage unit 110 may be configured with a program memory for storing an operating program of the camera device and programs for the sound photographing mode, and a data memory for storing photographed images. The storage unit 110 may include a buffer area for temporarily storing still images continuously output by the image sensor 120 and sounds output by the audio processing unit 160 in the sound photographing mode.

The display unit 140 displays images output by the image signal processor 130 under the control of the control unit 100, and displays general operating states of the camera device. The display unit 140 may be configured with an LCD or an OLED. An input unit 150 generates inputs for controlling photographing functions of the camera device. Here, the display unit 140 and input unit 150 may be formed in an integrated touch screen.

The audio processing unit 160 is connected to a microphone 163 and a speaker 165, which is configured to process and convert a sound received by the microphone 163 to digital data under the control of the control unit 100, and plays the digital data through the speaker 165 by converting the digital data to analog sound signals. The audio processing unit 160 may include a buffer for processing and temporarily storing sounds output by the microphone 163 under the control of the control unit 100 in the sound photographing mode. Here, the audio processing unit 160 maybe integrated in the control unit 100.

Figure 2:
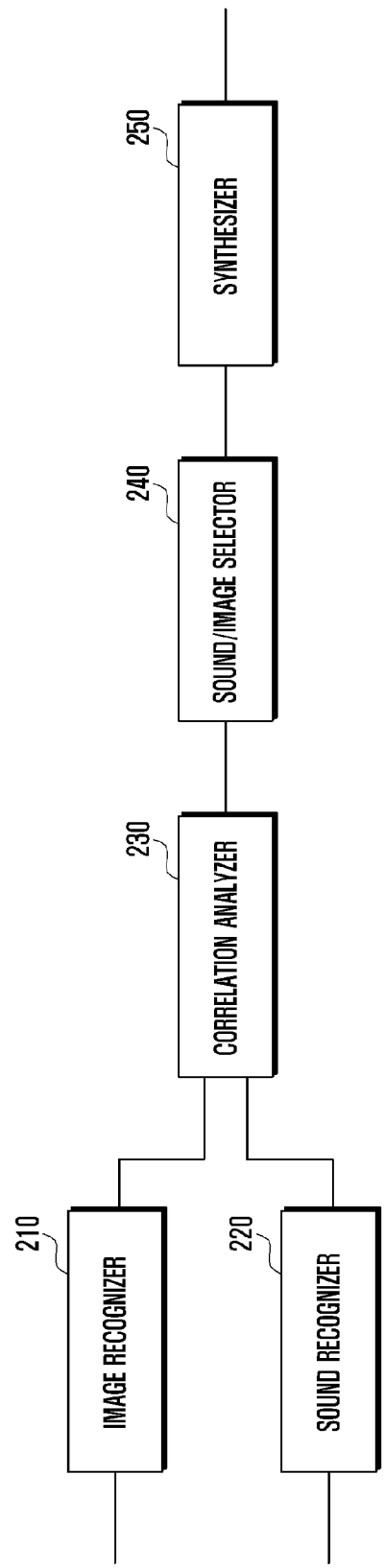
FIG. 2 is a block diagram illustrating a configuration of control unit for processing an image photographed by a camera device and recorded sound data.

FIG. 2 is a block diagram illustrating a configuration of control unit for processing an image photographed by a camera device and recorded sound data.

Referring to FIG. 2, an image recognizer 210 performs a function of recognizing a subject and extracting characteristics (attributes) of the subject. For example, in case of person, an emotion can be identified by analyzing movements of face muscles. The emotion of person appears from a face before a speech or an action. Accordingly, the image recognizer 210 analyzes the attribute of subject, detects a face area from an image output by the image signal processor 130 if the subject is a person, and decides the attribute of person's emotion by analyzing movements of eyes, nose, and mouth from the detected face area. Here, the attributes of emotion may include happiness, joy, an ambiguous "poker face", sadness, surprise, anger, tiredness/boring, excitement, and loneliness. If the subject is not a person, the image recognizer 210 identifies whether the subject is an animal (pet), and decides the attribute of the animal's emotion by analyzing the kind of animal and the animal's face. If the subject is an object (for example, an automobile, building, and firecracker), the image recognizer 210 decides the attribute of sound according to the shape or movement of the object.

A sound recognizer 220 identifies sound characteristics of a subject by analyzing sound data processed by the audio processing unit 160. The sound characteristics can be decided by analyzing the frequency, pitch, length, strength, and continuity of the sound. In case of person, the sound characteristics can be processed by matching with the attribute of person's emotion recognized from an image.

Information for recognizing an image and a sound (attributes of emotion in case of person or animal, and attributes of type and sound in case of object) can be stored in a database of the storage unit 110. For the recognition of image and sound, the currently available or disclosed recognition technologies can be utilized.

A correlation analyzer 230 decides an image and a sound having a high correlation each other by analyzing the recognized attributes of image and sound. For example, if an image is selected, the correlation analyzer 230 analyzes a sound from the outputs of the sound recognizer 220, which has a high correlation with the attribute of the image recognized by the image recognizer 210. Alternatively, if a voice is selected, the correlation analyzer 230 analyzes an image from the images recognized by the image recognizer 210, which has a high correlation with the sound attribute selected by the sound recognizer 220.

A sound/image selector 240 selects an image and a sound having a high correlation each other according to output of the correlation analyzer 230. If an image is selected, the sound/image selector 210 selects a sound having a high correlation with the attribute of the selected image (i.e., sound data in a buffering section having an attribute closest to the attribute of the selected image among the sounds stored in the buffer). If a sound is selected, the sound/image selector 210 selects an image having a high correlation with the attribute of the selected sound (i.e., image data having an attribute closet to the attribute of the selected sound among the images stored in the buffer).

A synthesizer 250 stores the selected image and sound in the storage unit 110 by synthesizing into a single file. The synthesized file may be configured with a header area, body area, and tail areas (additional data area) as already described. Encoding information and meta data of the still image and sound (for example, photographing information of still image) are stored in the header area, still image data is stored in the body area, and sound data is stored in the tail area.

Figure 3:
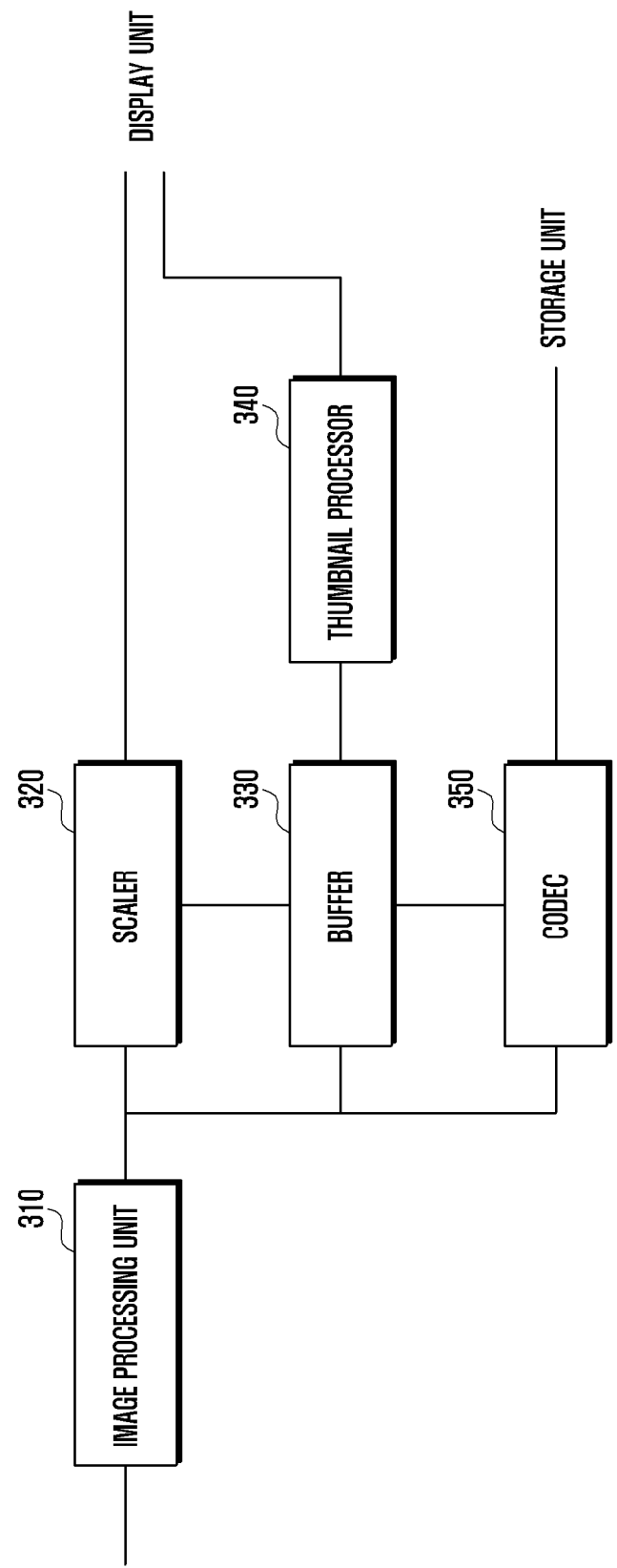
FIG. 3 is a block diagram illustrating a configuration of image processing unit in a camera device.

FIG. 3 is a block diagram illustrating a configuration of image processing unit in a camera device.

Referring to FIG. 3, the image processing unit 310 may be configured with a pre-processor and a post-processor. The pre-processor processes a full resolution image obtained by the image sensor 120. The pre-processor extracts "3A" or auto-white balance "AWB", auto-exposure "AE", and auto-focusing "AF" from the image output by the image sensor 120, and performs lens shading compensation, dead pixel correction, and knee correction. The post-processor may include a color interpolator, image processing chain "IPC", and image converter. The color interpolator performs a function of converting an image (e.g., "Bayer" data) output by the image sensor 120 to a color image. The IPC performs functions of noise reduction, gamma correction, luminance correction for a color interpolated image. The image converter converts a post-processed image to a "YUV" image. Namely, the post-processor performs functions of converting an image scaled by resizing an image to a YUV image after color interpolation and post-processing.

A scaler 320 resizes a full resolution image output by the image processing unit 310 to an image having a size suitable for displaying in the display unit 140. Here, scaling may be performed by decimation or by interpolation and decimation in order to fit to the screen ratio of the display unit 140. The image output by the scaler 320 may be displayed as a preview image by transmitting to the display unit 140.

The image output by the image processing unit 310 is transmitted to a buffer 330 for temporarily storing. The buffer 330 stores images output by the image processing unit 310 with a time unit predetermined under the control of the control unit 100 in the sound photographing mode. Namely, in the sound photographing mode, the control unit 100 controls the buffer 330 to store images with a predetermined time interval in a sound photographing section. The buffer 330 buffers the images output by the image sensor 120 with the predetermined time interval in the sound photographing section.

The buffer 330 may have a structure of ring buffer, and buffers a predetermined number of frame images in a preview mode. The reason of buffering images in the preview mode is to provide a zero shutter lag when capturing still images. If photographing of still image is requested, the control unit 100 outputs an image which can compensate a zero shutter lag time by selecting from the images stored in the buffer 330. For example, if the zero shutter lag is assumed to be 3 frames, an image preceding by 3 frames is selected from the images stored in the buffer 330.

A thumbnail processor 340 generates thumbnail images from the images stored in the buffer 330 and outputs them to the display unit 140 in the sound photographing mode.

A codec 350 compresses and encodes images selected from the buffer 330 under the control of the control unit 100. The codec 350 can encode a still image, and may include a JPEG codec for this purpose.

Figure 4A:
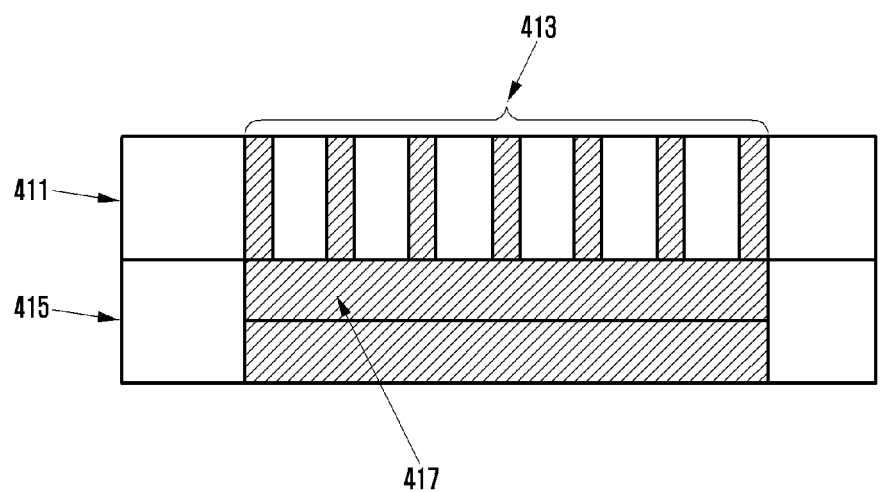
FIG. 4A, FIG. 4B and FIG. 4C are drawings illustrating configurations of image and sound data buffered in a sound photographing mode of a camera device.
Figure 4B:
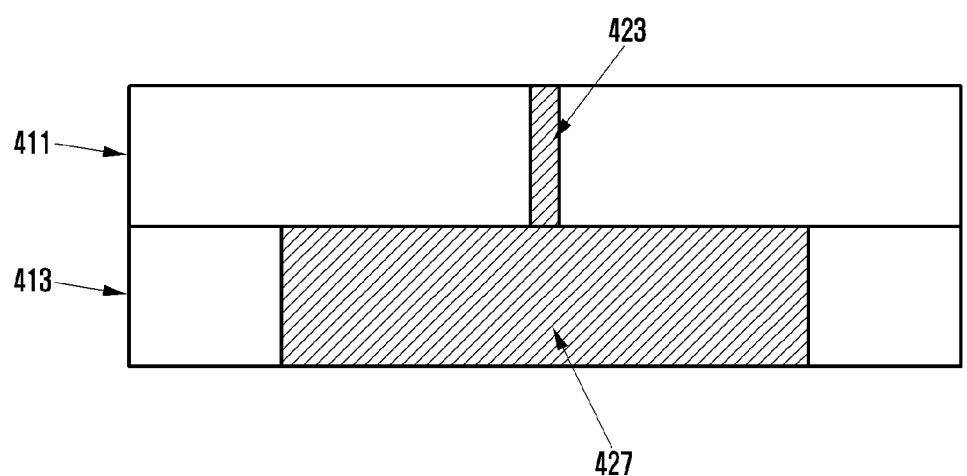
Figure 4C:
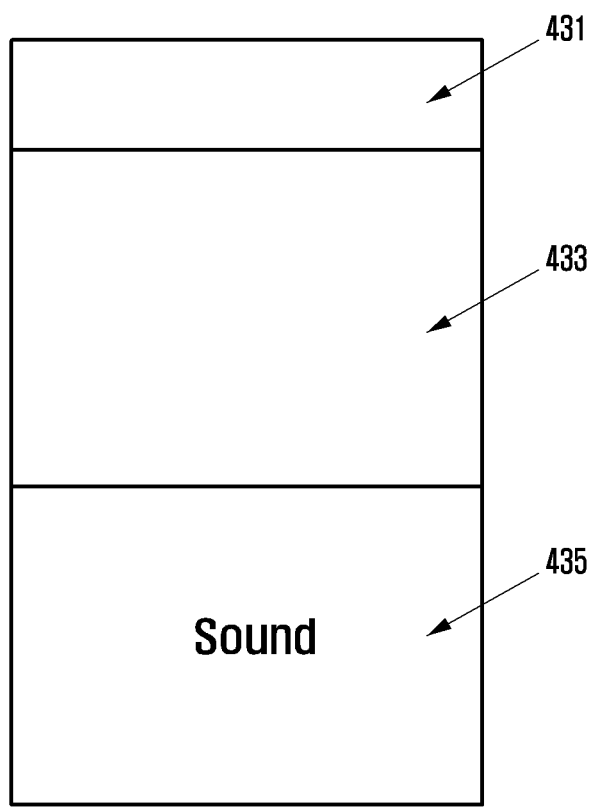

FIGS. 4A to 4C are drawings illustrating configurations of image and sound data buffered in a sound photographing mode of a camera device. FIG. 4A illustrates an example of image and sound data buffered in the sound photographing mode, FIG. 4B illustrates an example of image and sound data stored after photographing, and FIG. 4C illustrates a configuration of data recorded by the sound photographing.

The camera device having the above configuration stores an image together with a sound in the sound photographing mode. If a camera drive is requested, the control unit 100 obtains an image by driving the image sensor 120, and the image signal processor 130 displays the obtained image in the display unit 140 by processing (pre-processing and post-processing) and scaling. If a user commands a sound photographing through the input unit 150, the control unit 100 controls the image signal processor 130 to buffer the images obtained by the image sensor 120 for a predetermined time and process to still images, and controls the audio processing unit 160 to record a sound. Here, the image and the sound may be buffered as shown in FIG. 4A. In FIG. 4A, reference number 411 indicates an image frame sequence, and reference number 415 indicates a sound frame sequence. In the sound photographing mode, the image may include still images obtained for a predetermined time unit in the sound photographing section as shown by 413 of FIG. 4A, and the sound data is continuously recorded as shown by 417 of FIG. 4A.

An image can be stored with a sound by selecting an image 423 of FIG. 4B from the images buffered as shown by 413 of FIG. 4A. The image 423 of FIG. 4B can be selected by a user or by the control unit 100 from the buffered images 413 of FIG. 4A. Here, the selected image may be one having no blur or one having an emotion set by the user, and a plurality of images can be selected.

If an image is selected, the control unit 100 detects sounds corresponding to the selected image by identifying the selected image and recorded sounds. For example, if the selected image is a portrait of a laughing person, the control unit 100 detects a laughing state of the person in the process of image recognition, and decides a sound section corresponding to the laughing state. Subsequently, the control unit 100 controls to play a sound which is most well matched with the selected image, and stores the selected image and sound in the storage unit 110 as shown in FIG. 4B.

The control unit 100 may include a sound recognizer and can detect a sound most matched with the image in the following method. If a photographing command is input, the control unit 100 controls the image signal processor 130 and the audio processing unit 160 to store sounds and still images continuously photographed for a predetermined time as shown in FIG. 4A. Subsequently, the control unit 100 classifies the stored images in predetermined types, identifies a sound recorded at the time of photographing, and detects whether a sound satisfying the condition of the classified images exists. According to the result of detection, the control unit 100 controls to output and store a sound suitable for the image.

The image and sound data stored in the storage unit 110 may be configured with an image header 431 for storing photographing information and identification information for indicating a sound photographing, selected image data 433, and sound data 435 detected according to the selected image as shown in FIG. 4C.

Figure 5:
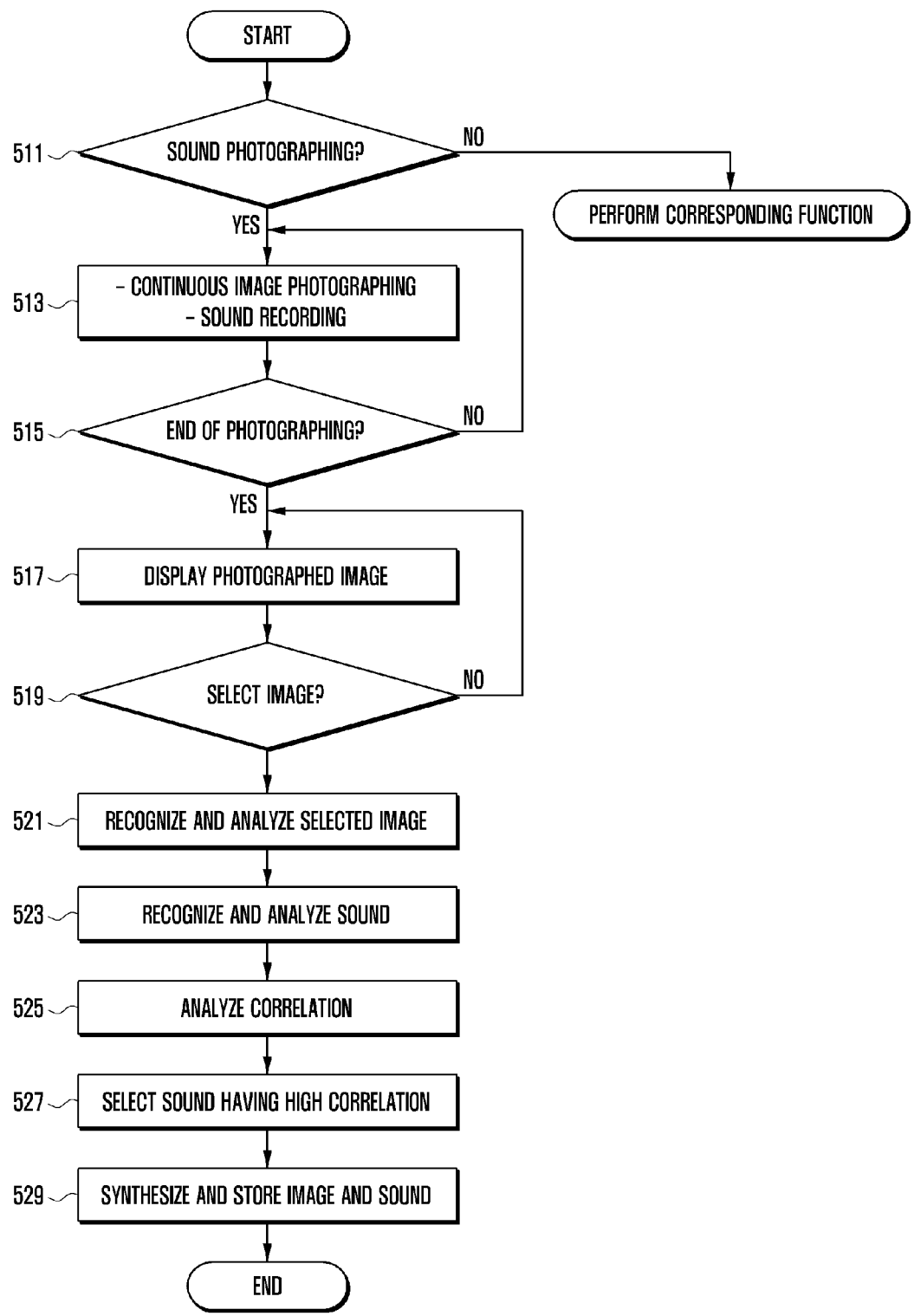
FIG. 5 is a flow chart illustrating a procedure of sound photographing in a camera device.

FIG. 5 is a flow chart illustrating a procedure of sound photographing in a camera device.

In general operation, if camera operation is requested thorough the input unit 150, the control unit 100 obtains an image by controlling the image sensor 120, and the image signal processor 130 displays the obtained image in the display unit 140 after processing (pre-process and post-process) and scaling. Namely, if camera operation is requested, the control unit 100 performs a preview mode of displaying in the display unit 140 by controlling the image signal processor 130 to process and scale the image obtained from the image sensor 120.

However, referring to FIG. 5, if a sound photographing is requested through the input unit 150 in the preview mode, then in operation 511, the control unit 100 detects the request, and in operation 513, buffers images and sound by continuously obtaining both image and sound for a predetermined time. The control unit 100 outputs images received from the image sensor 120 to the image signal processor 130 by obtaining for a predetermined photographing time, the image signal processor 130 processes the obtained images, and the buffer 330 buffers the processed images. The image buffered in the buffer 330 may be a full resolution image output by the image sensor 120. Here, the full resolution is used as a meaning of image pixels detected by the image sensor 120. Further, the control unit 100 controls the audio processing unit 160 to process and record a sound input through the microphone 163 for a predetermined photographing time while buffering the images by obtaining for a predetermined photographing time at operation 513.

For example, if the photographing time of the sound photographing mode is 5 sec and the time interval for obtaining images is 0.5 sec, in the sound photographing mode, the image signal processor 130 processes and buffers 10 frames of still images with the time interval 0.5 sec for 5 sec. Hereafter, the photographing time (e.g., 5 sec) is defined as a first time and the time interval (e.g., 0.5 sec) for obtaining images is defined as a second time.

Namely, in the sound photographing mode, the control unit 100 controls the image sensor 120 and the image signal processor 130 to capture and buffer still images with the interval of second time for the first time, and controls the audio processing unit 160 to record a sound for the period of the first time. The image processing unit 310 processes the still images obtained with the interval of second time and the buffer 330 buffers full resolution images output by the image processing unit 310 under the control of the control unit 100. The control unit 100 can control to display an indication of sound photographing mode while displaying a still image being photographed in the display unit 140 or to resize and display a frame image obtained from the image sensor 120 in the display unit 140. Namely, the control unit 100 controls the image processing unit 310 to pre-process and post-process an image obtained from the image sensor 120, and control the scaler 320 to output to the display unit 140 by resizing the processed image into a display image size.

Returning now to FIG. 5, if the first time is elapsed (i.e., if sound photography is terminated), then in operation 515, the control unit 100 detects the finish of sound photographing, and in operation 517, controls a thumbnail processor 340 to output an image stored in the buffer 330 to the display unit 140 after converting the image to a thumbnail image. Here, the image stored in the buffer 330 may be a plurality of still images taken for the sound photographing time, the thumbnail processor 340 converts the stored still images to thumbnail images, and the display unit 140 displays the thumbnail images.

The camera device can select an image from the images taken in the sound photographing and store the image together with a recorded sound. A method of selecting a still image can be performed by selecting a thumbnail image displayed in the display unit 140 or by selecting a still image having the highest correlation with a recorded sound according to the result of identifying and analyzing the recorded sound. Here, it is assumed that the thumbnail image is displayed in the display unit 140 and a still image is selected according to a thumbnail image designated by a user.

If an image is selected, then in operation 519, the control unit 100 detects the selection, and in operation 521, identifies the selected image. The identification of the selected image checks whether the subject included in the image is a person or an object. If the subject is a person, an emotion state of the person can be identified by analyzing the face area of the person. The emotion state may be one of joy, anger, sorrow, and pleasure, which can be decided by analyzing the movements of person's face muscles. The control unit 100 includes an image recognizer 210 which can detect emotions by analyzing the movements of person's face muscles. Here, the image recognizer 210 can identify various emotion states such as happiness, joy, an ambiguous expression or a "poker face", sadness, surprise, anger, tiredness/boring, excitement, and loneliness. In case of animal (for example, a dog), a recognition technology similar to the face recognition of person can be used. Further, recognition of an object can be performed according to characteristics of the object. For example, an automobile, aircraft, train, tree, and building respectively has a unique shape. Further, an object has a specific image shape in a specific state (for example, when a firecracker explodes in the air).

After identifying and analyzing the selected image, at operation 523, the control unit 100 analyzes a recorded sound. The control unit 100 includes a sound recognizer 220, and the sound recognizer 220 identifies and analyzes the recorded sound to select a sound corresponding to an image (person or object) identified under the control of the control unit 100. In case of person, sounds can be set according to person's emotions by analyzing the frequency, strength, continuity, pitch of sound (i.e., voice). In case of object, a unique sound generated by the object can be set. For example, an automobile, aircraft, train, and firecracker respectively generates a specific sound. Accordingly, if the subject of image is an object, a corresponding sound section can be mapped with a recorded sound.

Subsequently, at operation 525, the control unit 100 analyzes a correlation of sound corresponding to the selected image, and at operation 527, plays the sound through the audio processing unit 160 by selecting a sound section having a high correlation. A method for detecting a sound suitable for the selected image is performed by analyzing a recorded sound at the time of photographing the selected image, detecting a sound satisfying the condition of classified images, and selecting and displaying a suitable sound according to the result of detection. The control unit 100 synthesizes and stores the selected image and the sound having a high correlation at operation 529. Here, the stored image and sound may have a structure shown in FIG. 4C. Namely, through operations 521 to 529, the control unit 100 identifies an image selected from continuously photographed images, detects a sound having a high correlation with the identified image from recorded sounds, plays the detected sound most suitable for the selected image, and stores the playing sound in the storage unit 110 together with the image. Here, the control unit 100 can store images and sounds obtained from the sound photographing mode in the storage unit 110. In this case, the images and sounds obtained from the sound photographing mode can be synthesized in an image editing mode.

Figure 6B:
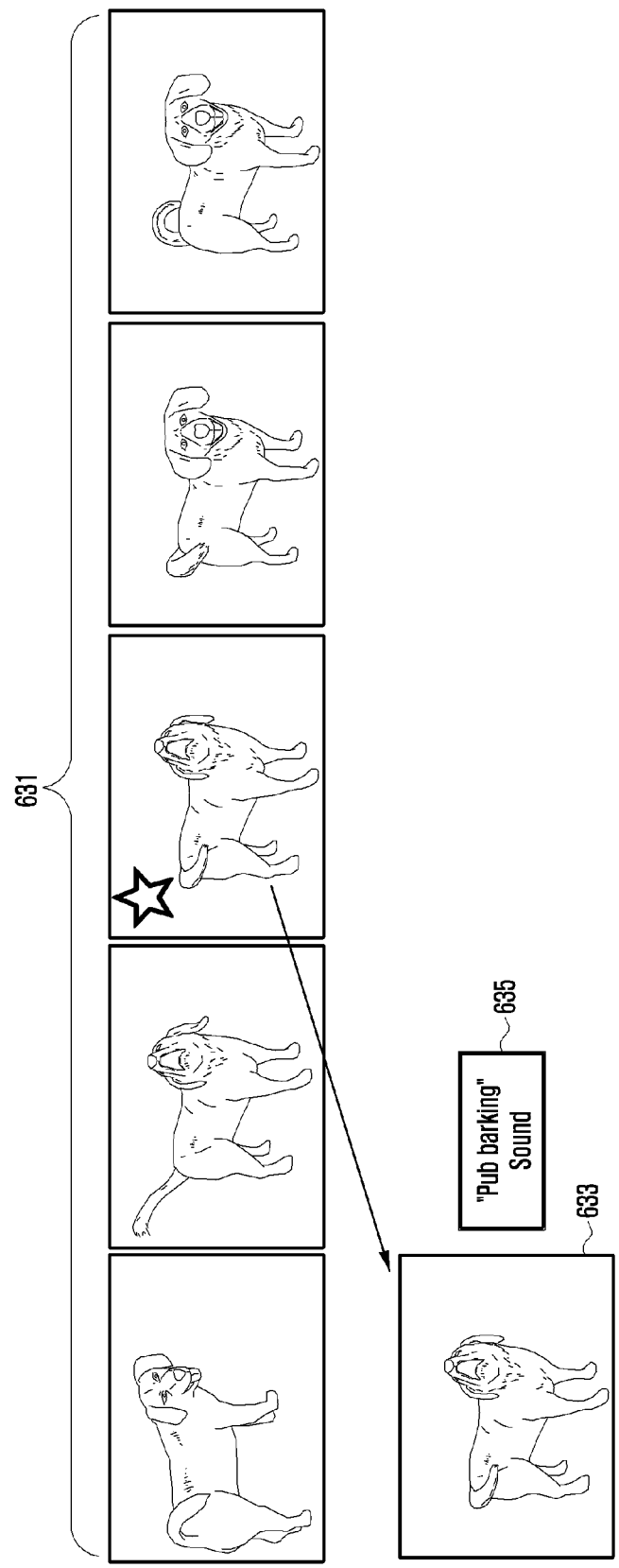
Figure 6C:
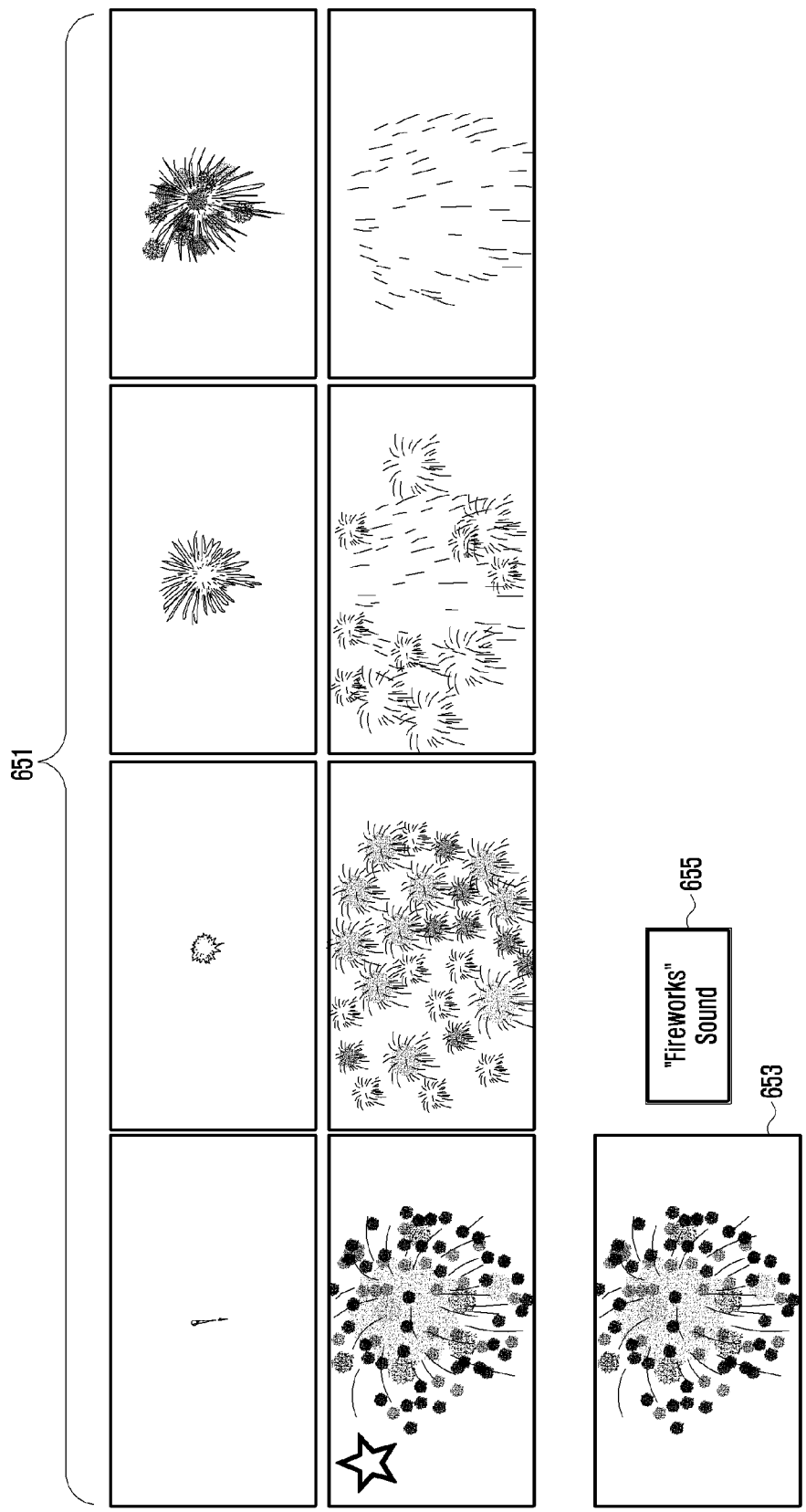

FIGS. 6A to 6C are drawings illustrating examples of which a plurality of images selected in sound photographing is recorded at the same time of recording a sound, and the image and sound are stored after selecting a sound having a high correlation with the image. FIG. 6A illustrates an example of photographing a child in the sound photographing mode, FIG. 6B illustrates an example of photographing a dog in the sound photographing mode, and FIG. 6C illustrates an example of photographing a firework in the sound photographing mode.

As described above, the camera device continuously photographs images while recording a sound in the sound photographing mode at operation 513, and continues to photograph until the photographing is finished at operation 515. Here, the sound photographing starts at the time of user's request, and the photographing automatically terminates if a predetermined time (i.e., first time) is elapsed. However, the start and end of the photographing can be decided according to a user's operation. Namely, the sound photographing can be performed while the user holds a photographing button (shutter switch on). Further, the camera device buffers images and sounds in a preview mode, and can set image and sound obtaining sections at the time of user's request for the sound photographing. For example, if a user's photographing command is input while buffering the images and sounds in a first-in-first-out memory such as a ring buffer, the images and sounds can be stored in a few seconds before and after the time of inputting the command.

Although an example of storing an image and a sound in the same time section has been described, the time sections of the image and sound can be set differently. Alternatively, storing times can be decided through the analysis of the image and sound. The photographing can start if a specific sound or image is detected while storing sounds and images in the ring buffer. For example, in case of firework, sound recording can be started by deciding the time of firecracker's explosion as the start time of firework, and an image can be obtained by deciding the time of expanding firework as the time of photographing.

If the end of photographing is detected at operation 515, the control unit 100 converts buffered images to thumbnail images and displays them in the display unit 140 at operation 517. The images are displayed as shown by 611 of FIG. 6A, 631 of FIG. 6B, or 651 of FIG. 6C. In the state of displaying the images, the control unit 100 identifies a selected image. The selection of the image can be performed by the control unit 100 according to a predetermined condition or a user's selection. Here, the best image can be automatically selected from the photographed images by considering the sharpness of image (.e.g., the focus of an image), facial expression, closed eyes, and red eyes.

Subsequently, the control unit 100 identifies and analyze the selected image at operation 521. Here, the control unit 100 can analyze only the selected image or a plurality of images taken in the same period by comparing each other. For example, if images of laughing persons are taken as shown by 611 of FIG. 6A, persons' faces are detected from a plurality of images, and image 621 having the most open mouth is recommended by comparing the sizes of mouths. Namely, through the comparison with other images, it can be estimated that a laughing sound is generated from the recommended image not from the other images. If an image having a largely open mouth is not detected, it is desirable to recommend a smiling face. Further, a method of detecting a movement can be used. For example, when a scene of talking persons is photographed, a scene including a larger gesture or a moment of largely open mouth rather than closed mouth can be detected as the recommended image.

As another example, in case of photographing a dog as shown in FIG. 6B, moments of dog moving, facing the front, and opening a mouth can be compared, and the moment of opening the mouth can be estimated at the moment of barking. Further, the moment of facing the front can be estimated that the dog focuses its attention to listen to a particular sound. As another example, in case of photographing a scene of firework as shown in FIG. 6C, a launch of a firecracker or an explosion of a firecracker can be compared, and the moment of exploding firecracker can be set as the moment in which the recorded sound was generated.

If a category of image classification using the face detection doesn't exist, an image having the greatest movement may be selected and, in particular, an image having the greatest movement in the center area of image may be selected. For example, in case of firework image as shown in FIG. 6C, an image having the greatest movement and variation may be selected as a suitable image while comparing a plurality of photographed images. In case of car moving and crossing a screen, an image of car located in the center of the screen is desirably selected as a suitable image together with a sound of car.

After selecting the image, the control unit 100 analyzes the selected image at operation 521, and identifies and analyzes a sound pattern at operation 523. The sound pattern may be classified into an onset map, harmonic map, and position map through the analysis of frequency. For example, a human voice such as a laugh and a speech, kinds of animals, sound of a specific object such as an automobile, and music sound having a specific genre can be distinguished. Further, the method of analyzing a sound may differ according to the classified images. For example, if a human face is detected, a human voice may be analyzed within the range of voice frequencies to improve the accuracy of analysis, and to save the time necessary for analysis.

After identifying and analyzing the selected image and the recorded sound, the control unit 100 analyzes a correlation between the selected image and the recorded sound at operation 525, selects a sound having a high correlation with the image at operation 527, and synthesizes and stores the image and sound at operation 529. The image and sound may be stored as shown by 613 and 615 of FIG. 6A, 633 and 635 of FIG. 6B, or 653 and 655 of FIG. 6C. At this time, the control unit 100 controls to play the selected sound through the audio processing unit 160 and to display the image in the display unit 140.

Figure 7A:
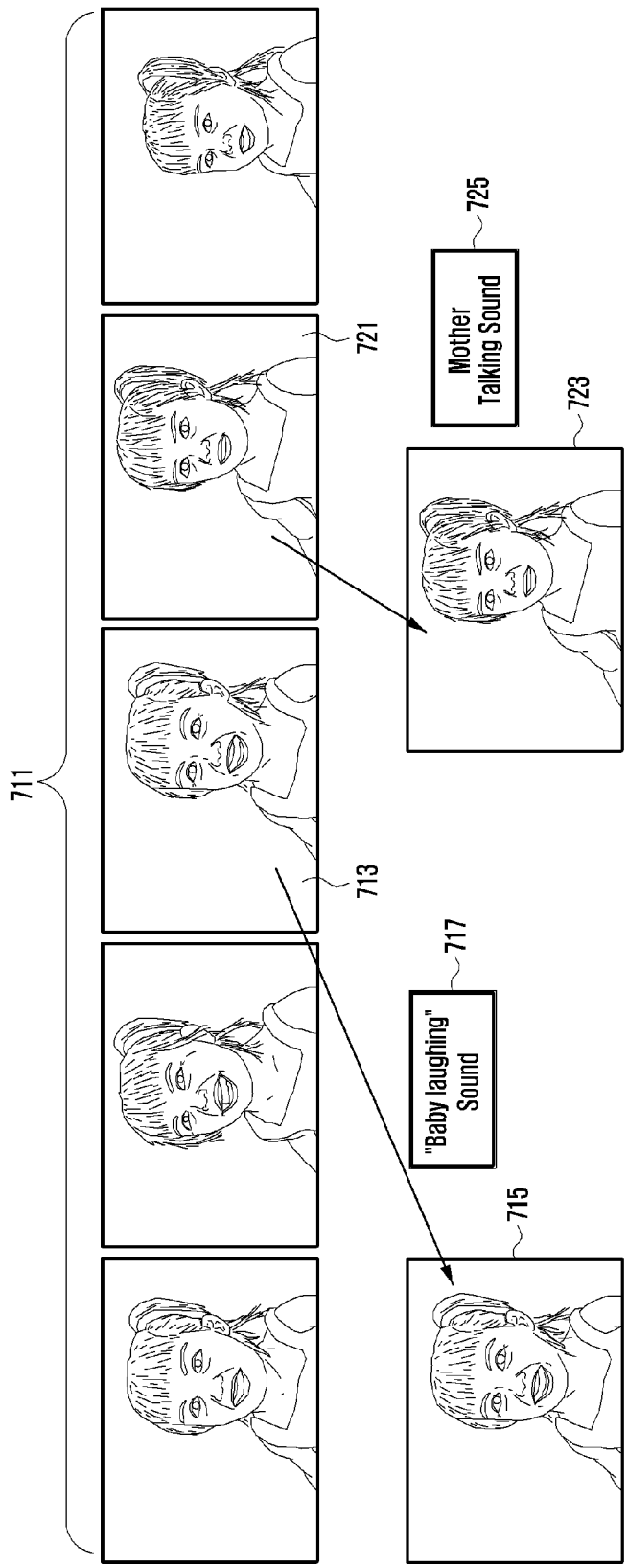
FIG. 7A and FIG. 7B are drawings illustrating examples of processing a plurality of images and related sounds.
Figure 7B:
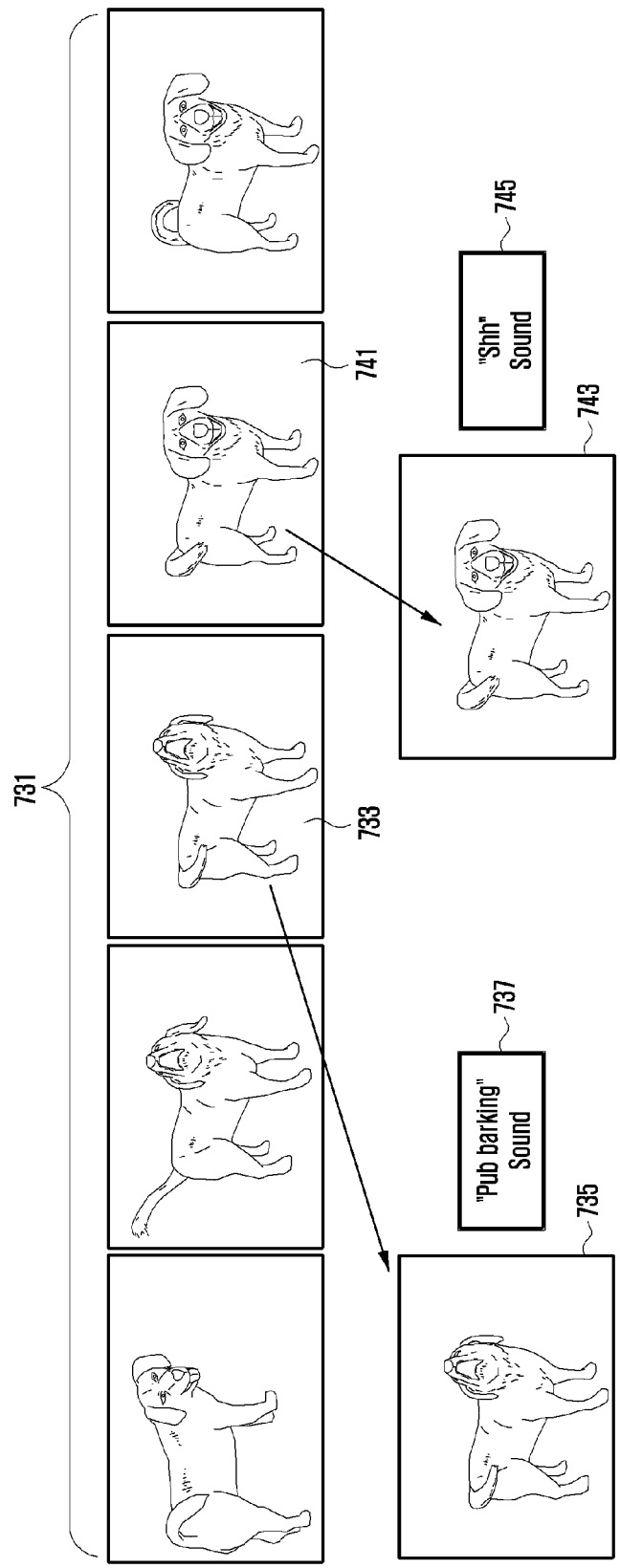
Figure 8A:
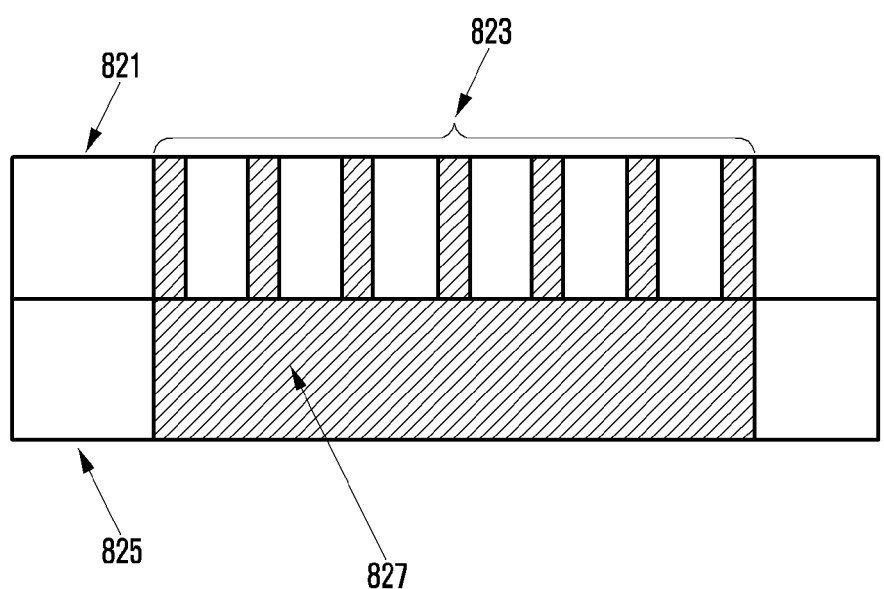
FIG. 8A, FIG. 8B and FIG. 8C are drawings illustrating examples of synthesizing a plurality of images and related sounds.

FIG. 5 illustrates a method for selecting an image and synthesizing with a sound. However, when selecting at least 2 images, sounds suitable for corresponding images may be displayed by repeating the sound analysis operation, and the selected images may be stored with the sounds if a user makes a final decision. FIGS. 7A and 7B are drawings illustrating examples of processing a plurality of images and related sounds; and FIGS. 8A to 8C are drawings illustrating examples of synthesizing a plurality of images and related sounds.

Figure 8B:
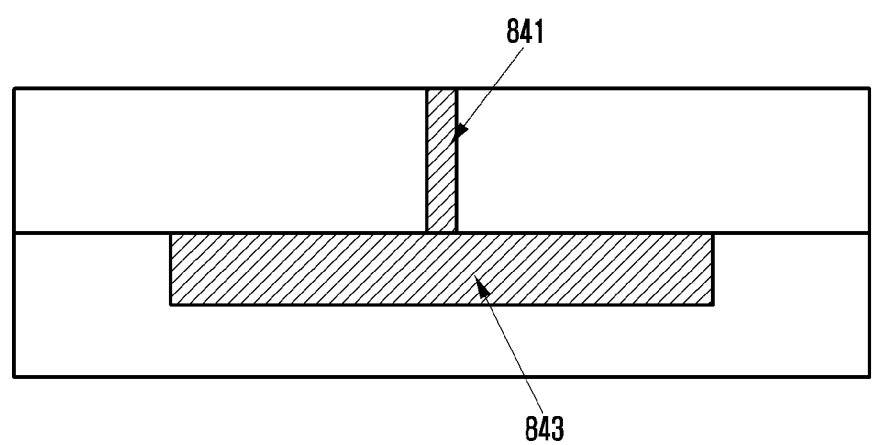
Figure 8C:
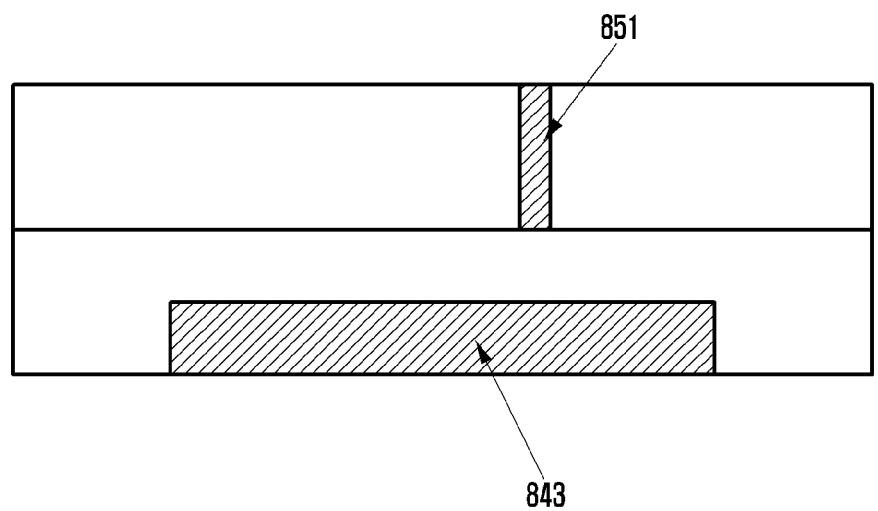

Referring to FIGS. 7A and 7B, and 8A to 8C, if the sound photographing is terminated, the control unit 100 detects it at operation 515, and displays buffered images as shown by 711 of FIG. 7A at operation 517. Here, a plurality of images 823 are stored in the buffer 330 of the image signal processor 130 and the audio processing unit 160 records a sound as shown by 827. Here, the sound 827 may include different sound patterns. The control unit 100 displays stored images 823 of FIG. 8A in the display unit 140 as shown by 711 of FIG. 7A. If two images 713 and 721 are selected from the displayed images 711, the control unit 100 detects it at operation 519, and selects sounds having a high correlation with the selected images 713 and 721 by performing operations 521 to 527. If a face of laughing baby is selected as shown by 713 of FIG. 7A (alternatively, the image can be described as 841 of FIG. 8B), the control unit 100 selects a sound section including a baby's laughing sound (such as, for example, 843 of FIG. 8B) from the recorded sound, and if an expressionless face of baby is photographed as shown by 721 (alternatively, the image can be 951 of FIG. 8C), the control unit 100 may select a sound section not including the baby's laughing sound (for example, a section recorded with a mother's voice 853 of FIG. 8C). The control unit 100 then synthesizes the image and sound as shown in FIG. 8B at operation 529, and stores the synthesized image and sound as shown in FIG. 8C. In this case, data of the images and sounds may be stored in the storage unit 110 as shown by 715 and 717, and 723 and 725 of FIG. 7A.

If images shown in FIG. 7B are photographed in the sound photographing mode, a plurality of images is stored in the buffer 330 of the image signal processor 130, as shown by 823. The audio processing unit 160 records a sound as shown by 827. The control unit 100 then displays the stored images in the display unit 140 as shown by 731 of FIG. 7B. If two images 733 and 741 are selected from the displayed images 731, the control unit 100 detects it at operation 519, and selects sounds having a high correlation with the selected images 733 and 741 by performing operations 521 to 527. If an image of a barking dog is selected as shown by 733 of FIG. 7B (alternatively, the image can be 841 of FIG. 8B), the control unit 100 selects a sound section including a sound of barking dog (such as, for example, 843 of FIG. 8B) from the recorded sound, and if an expressionless face of dog is captured as shown by 741 (alternatively, the image can be 951 of FIG. 8C), the control unit 100 may select a sound section not including the sound of barking dog (such as, for example, a section including a human voice 853 of FIG. 8C). The control unit 100 then synthesizes the images and sounds as shown in FIG. 8B at operation 529, and stores the synthesized image and sound as shown in FIG. 8C. In this case, data of the images and sounds may be stored in the storage unit 110 as shown by 735 and 737, and 743 and 745 of FIG. 7B.

Figure 9:
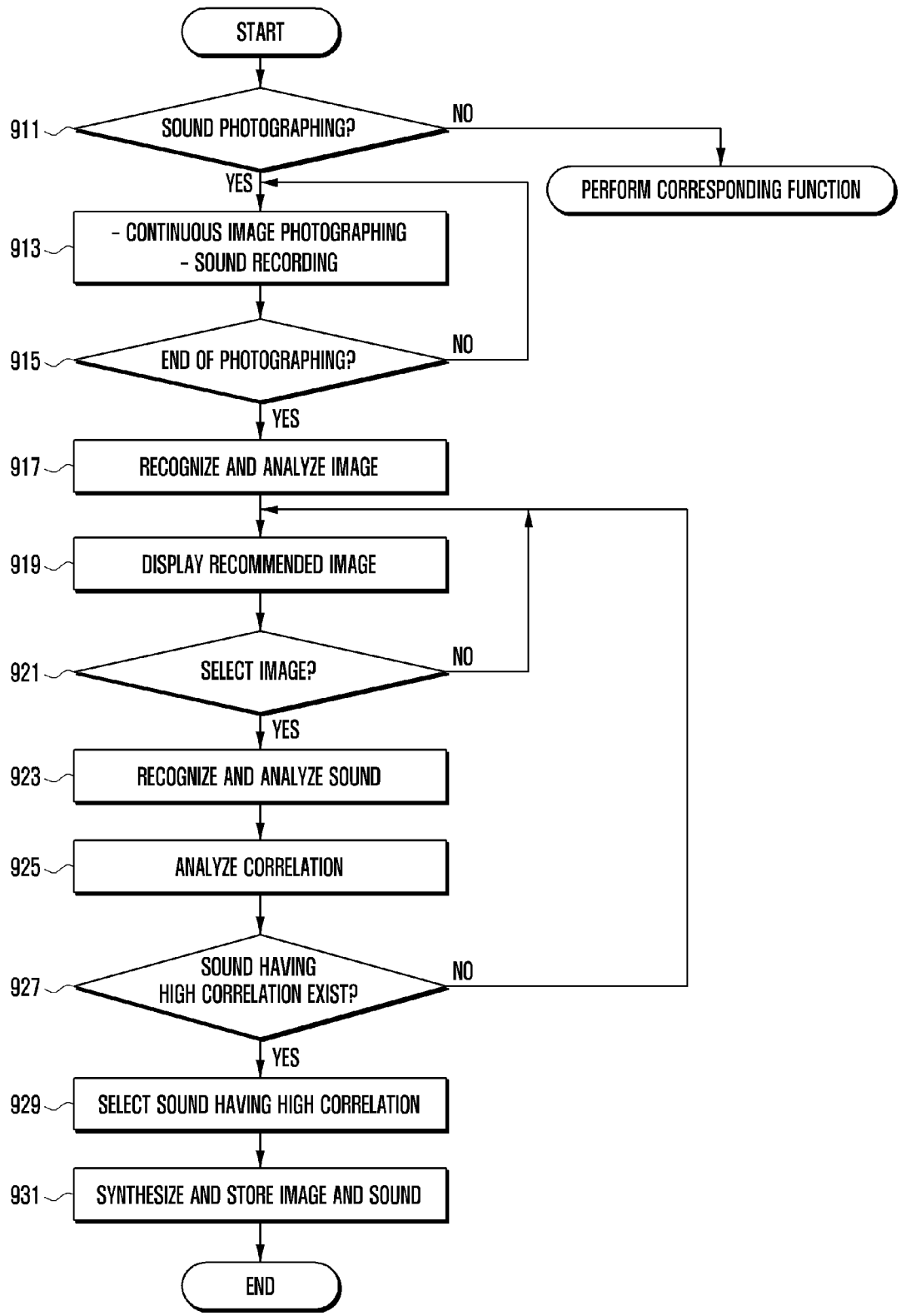
FIG. 9 is a flow chart illustrating another procedure of processing a selected image and a sound in a sound photographing mode.

In the sound photographing, a sound or sounds may be synthesized with a selected image or selected images after detecting them. However, in some cases, a combination of a sound and an unselected image could be better than the combination of the sound and the selected image. FIG. 9 is a flow chart illustrating another procedure of processing a selected image and a sound in a sound photographing mode.

Referring to FIG. 9, an image and a sound are stored in the sound photographing mode by performing operations 911 to 915. The operations 911 to 915 are identical to the operations 511 to 515 of FIG. 5. Subsequently, the control unit 100 identifies and analyzes the images stored at operation 917, and displays a specific image as a recommended image at operation 919. Here, the control unit 100 can recommend the best image by comparing photographed images based on the sharpness of image, expression of person, closed eyes, and red eyes if a person is included in the image. The recommended image may be displayed with a recommendation identifier (such as, for example, a star mark shown in FIGS. 6A to 6C) in the display unit 140. Alternatively, the control unit 100 can omit operation 917, and display the photographed images as it is at operation 919 (for example, in case of FIGS. 7A and 7B). As described above, the control unit 100 can automatically select an image according to a predetermined condition, or the image may be selected according a user's decision.

If an image is selected, the control unit 100 detects it at operation 921, identifies sounds at operation 923, and selects a sound having a high correlation with the selected image at operation 924. If a sound having a high correlation with the selected image doesn't exist, the control unit 100 detects it at operation 927 and displays other images so that another one can be selected at operation 919. If a sound having a high correlation with the selected image is detected at operation 927, the control unit 100 synthesizes and stores the image and sound in the storage unit 110 by performing operations 929 and 931. Here, the operations 929 and 931 can be performed in the same method as operations 527 and 529 of FIG. 5. Here, the control unit 100 can store the images and sounds obtained from the sound photographing mode in the storage unit 110.

The method for simultaneously identifying and analyzing images and sounds in the sound photographing mode requires a time for photographing, identifying, and analyzing, and there can be a limit to continuously perform the sound photographing mode. After synthesizing and storing the image and sound in the sound photographing mode, it may be required to synthesize the sound with another image. After recording an image and a sound simultaneously in a corresponding scene, only the image can be captured. The same analysis can be performed for image files including image-sound, and image files including only the image. If an image-sound combination better than the stored image-sound combination exists, the control unit 100 can store the images and sounds by re-combining. In order not to deteriorate the sense of realism, location information using a GPS and photographing time information can be limited to a predetermined range for the conditions of editing.

The photographed images can be shared. Generally, methods for storing an image and a sound simultaneously don't follow a standard method, and thereby a sound signal included in a nonstandard area can be deleted in a process of uploading the image file including the sound signal. Therefore, a user who downloaded the corresponding image file may not be possible to play a sound from the downloaded image file. If the aforementioned method is used, an image file including a sound can be regenerated when using a standard image format, because images for each sound can be easily found even though the image and the sound are separately uploaded and downloaded.

Figure 10:
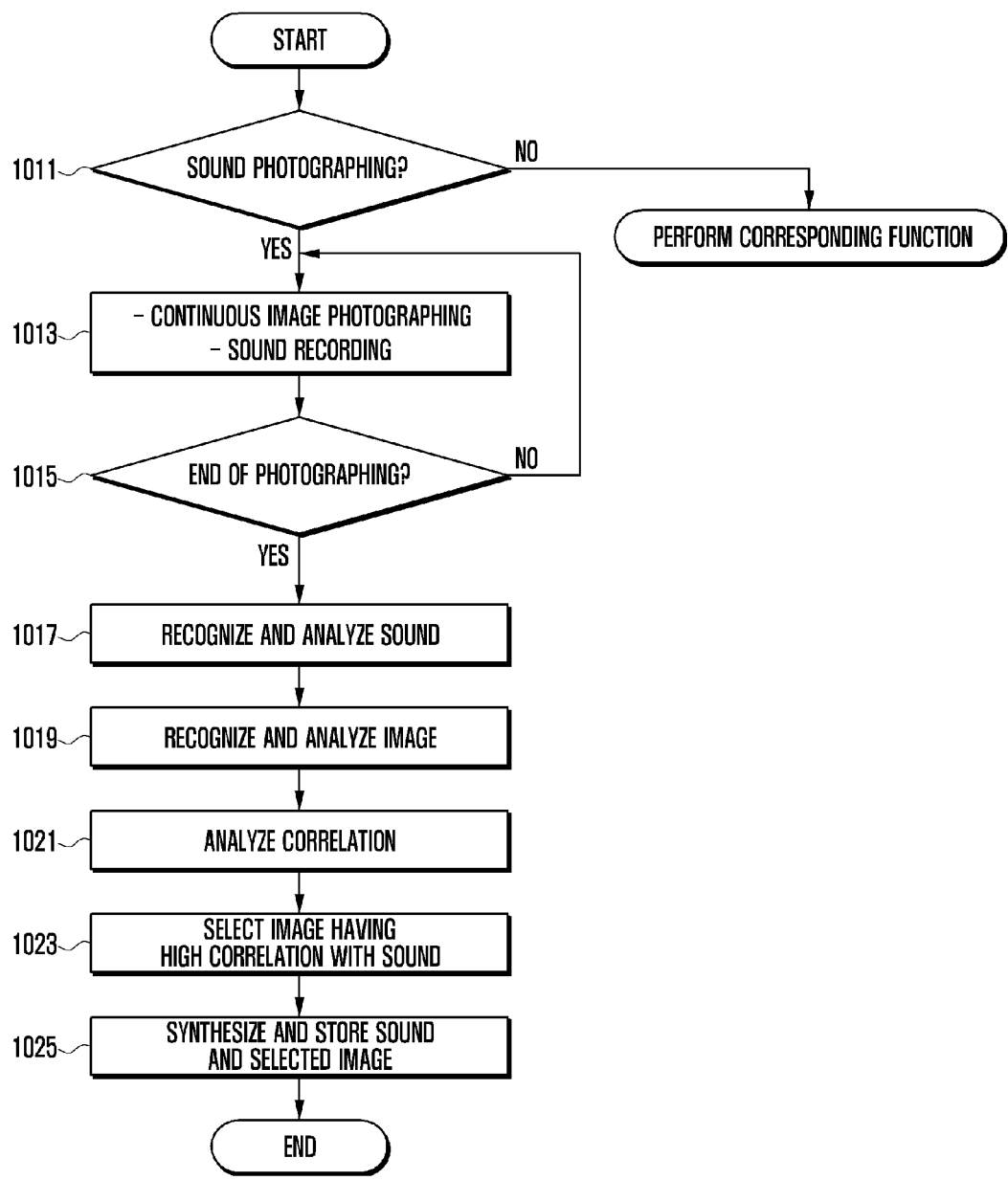
FIG. 10 is a flow chart illustrating a procedure of sound photographing in a camera device according to another embodiment of the present disclosure.

FIGS. 5 and 9 illustrate methods for simultaneously and respectively recording an image and a sound in a sound photographing mode, and synthesizing the image and sound after selecting an image and selecting a sound having a high correlation with the selected image. However, control unit 100 can simultaneously and respectively record an image and a sound in the sound photographing mode, and synthesize the image and sound after analyzing the sound first and selecting an image having a high correlation with the analyzed sound. FIG. 10 is a flow chart illustrating a procedure of sound photographing in a camera device according to another embodiment of the present disclosure.

Referring to FIG. 10, the control unit 100 firstly identifies whether a sound photographing mode is set at operation 1011, and buffers images and sounds until the photographing is terminated by performing operations 1013 and 1015. If the photographing is terminated, the control unit 100 analyzes the recorded sound at operation 1015. When analyzing the sound, the control unit 100 can select a sound having a highlight characteristic from the recorded sounds. The control unit 100 identifies and analyzes a photographed image at operation 1019. Subsequently, the control unit 100 analyzes correlations between the images and sounds at operation 1021, selects an image having the highest correlation with a sound at operation 1023, and stores the sound and image in a single file at operation 1025. Namely, in the method of sound photographing shown in FIG. 10, the control unit 100 selects a sound section by identifying and analyzing the recorded sound. Subsequently, the control unit 100 selects an image having the highest correlation by identifying and analyzing the images, and stores the selected image in a single file by combining with a sound.

The camera device can be provided as an electronic device. Here, the electronic device may be one of digital equipment such as a mobile phone including a smart phone, MP3 terminal, tablet PC, and computer. FIG. 11 is a block diagram illustrating a configuration of electronic device performing a photographing operation according to an embodiment of the present disclosure.

Referring to FIG. 11, a communication unit 170 performs a communication function with a base station or an internet server. The communication unit 170 may be configured with a transmitter for amplifying and up-converting the frequency of transmitting signal, and a receiver for low noise amplifying and down-converting the frequency of received signal. Further, the communication unit 170 may include a modulator and a demodulator. The modulator transmits a transmitting signal to the transmitter by modulating and the demodulator demodulates a signal received through the receiver. In this case, the modem (modulator and demodulator) may be an LTE, WCDMA, GSM, WIFI, WIBRO, NFC, or Bluetooth. In the embodiments of the present disclosure, it is assumed that the communication unit 170 is configured with an LTE, WIFI, and Bluetooth units.

A camera 120 may include an image sensor, and may be configured with a dual camera. In this case, a first camera is installed at the rear side of the device and can photograph a high resolution image. A second camera is installed at the front side of the device and photographs a low resolution image comparing to the first camera.

The control unit 100 controls general operations of the electronic device, and may include an AP (application processor) for processing various applications of the electronic device and a CP (communication processor) for controlling a communication function of the electronic device. The AP can perform a sound photographing mode according to the embodiments of the present disclosure, and may include components shown in FIG. 2.

A storage unit 110 may include a program memory for storing an operating program of the electronic device and programs according to the embodiments of the present disclosure, and a data memory for storing tables for the operations of the electronic device and data generated while executing a program.

An image processing unit 130 can be included in the AP of the control unit 100, and may have the configuration shown in FIG. 3. The image processing unit 130 performs functions of processing images photographed by the camera 120, scaling the image into a display image size, compressing and encoding a captured image, and decoding a compressed and encoded image. Further, the image processing unit 130 includes a thumbnail processor for converting images temporarily stored in the sound photographing mode to thumbnail images.

A display unit 140 displays an application being executed under the control of the control unit 100. The display unit 140 displays images taken in the sound photographing mode as thumbnail image under the control of the control unit 100. The display unit 140 may be an LCD or an OLED. An input unit 150 may be provided in a capacitive type or a resistive type, and outputs location information of a user' touch (hereafter, a finger touch is assumed) to the control unit 100. The input unit 150 may further include an EMR sensor pad, and outputs a pen touch input to the control unit 100. Here, the display unit 140 and the input unit 150 may be configured in an integral form.

An audio processing unit 160 processes and records a sound received from a microphone 163 in a sound photographing mode under the control of the control unit 100. The audio processing unit 160 may include an audio buffer for temporarily storing the sound. Further the sound recorded in the sound photographing mode may be temporarily stored in the storage unit 110 under the control of the control unit 100. Further, the audio processing unit 160 processes a voice signal generated in a communication mode under the control of the control unit 100.

In the electronic device having the above configuration, the image processing unit 130 transmits an image output by the camera 120 in a preview mode to the display unit 140 by processing into a display image size. If a sound photographing is requested through the input unit 150 in the preview mode, the control unit 100 continuously obtains and buffers images and sounds for a predetermined time. Obtaining the images and sound for a predetermined time may be performed in various methods. As a first method, the images and sounds can be obtained for a predetermined time from the time of requesting for a sound photographing mode.

Secondly, the camera device buffers the images and sound in a preview mode, and sets sections for obtaining the images and sounds (e.g., storing the images and sounds for a few seconds before and after the time of the photographic capture was requested).

Thirdly, a time range for storing an image and a time range for storing a sound can be set differently. Fourth, times for storing the images and sounds can be decided according to the analysis result of the images and sounds. The images buffered in the sound photographing is obtained for a set photographing time section (such as, for example, a first time), and an interval of obtaining still images may also be set (such as, for example, a second time). Here, the still image may be a full resolution image output by the image sensor 120. While obtaining the images, the control unit 100 controls the audio processing unit 160 to process and record a sound received from a microphone 163 for a predetermined time.

If the sound photographing is terminated, the control unit 100 controls to display the images obtained for the set photographing time in the display unit 140 by converting the images to thumbnail images. If an image is selected, the control unit 100 identifies and analyzes the selected image. The image can be selected from the thumbnail images displayed in the display unit 140 according to a user's decision, or the control unit 100 can select a still image having the closest characteristics according to the analysis result of identifying and analyzing the displayed images and/or sounds.

If an image is selected, the control unit 100 identifies whether the selected image is the main subject of person or object. If the main subject is a person, an emotion state of person can be identified by analyzing the face area of the person. The emotion state may be one of joy, anger, sorrow, and pleasure, which can be decided by analyzing movements of face muscles. The control unit 100 includes an image recognizer 210, and the image recognizer 210 can identify various emotion states such as joy, surprise, sadness, anger, fear, tiredness, and expressionless face. In case of animal (such as, for example, a dog), a similar recognition technology can be used. In recognition of an object, the object may have unique image characteristics. For example, an automobile, aircraft, train, tree, or building each respectively have a unique shape. Further, the object can have a specific image form in a specific state (for example, when a firecracker explodes in the air).

After identifying and analyzing the selected image, the control unit 100 analyzes a recorded sound. In order to select a sound corresponding to the identified image (person or object), the control unit 100 identifies and analyzes the recorded sound. Subsequently, the control unit 100 analyzes a correlation between the selected image and the corresponding sound, and plays the sound through the audio processing unit 160 after selecting a sound section having a high correlation. The control unit 100 then synthesizes and stores the selected image and the sound having a high correlation. Here, the control unit 100 can store the images and sounds obtained from the sound photographing mode in the storage unit 110. In this case, after performing the sound photographing mode, desired image and sound can be synthesized by performing an image editing mode. Alternatively, the control unit 100 can select a sound first, select an image having a high correlation with the sound, and synthesize and store the selected sound and image.

When photographing an image in a camera device, an audio can be recorded with a still image having a high correlation, and the still image and the recorded sound can be stored by synthesizing. Namely, when photographing with a camera device or an electronic device having a camera, sounds and still images are continuously stored for a predetermined time, the sound and still image can be store in a single file by selecting an audio related to the image from the recorded audio, and a sound classified as the most suitable to an image can be played when playing an image file.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Although embodiments of the disclosure have been described in detail hereinabove, it should be understood that many variations and modifications of the basic inventive concept described herein will still fall within the spirit and scope of the disclosure as defined in the appended claims.

What is claimed is:

1. A method for photographing an image in an electronic device having a camera and a microphone, the method comprising:
   when a sound photographing mode is active, recording, for a set period of time, a series of images and a series of sounds using the camera and the microphone;
   determining an attribute of a subject by identifying the subject from the series of images;
   selecting a particular image from the series of images and a particular sound from the series of sounds having a high correlation with the particular image based on the determined attribute of the subject; and
   synthesizing the selected particular sound with the selected particular image and storing the synthesized particular sound with the particular image.

2. The method of claim 1, wherein the selection of the particular image from the series of images comprises:
   displaying the series of images by converting each image in the series of images to thumbnail images and displaying the thumbnail images;
   selecting at least one image from the displayed thumbnail images; and
   setting the selected at least one image as the particular image.

3. The method of claim 2, wherein the selecting of the at least one image comprises receiving an input indicating the at least one image from among the thumbnail images.

4. The method of claim 3, wherein the displaying of the thumbnail image comprises highlighting a particular thumbnail image from among the displayed thumbnail images, based on the particular thumbnail having a focus higher than a focus of other displayed thumbnail images, or capturing a desired movement of a subject compared to the other displayed thumbnail images, as determined by a comparison of the displayed thumbnail images against one other.

5. The method of claim 2, wherein the sound photographing mode is configured to:
   execute for a first time, the first time set to start from a time the sound photographing mode was activated;
   record the series of sounds during the first time; and
   record the series of images during a second time, the first time being longer than the second time.

6. The method of claim 2, wherein the recording the series of images and the series of sounds further comprises:
   temporarily storing the series of images and the series of sounds in a buffer in a preview mode,
   storing the temporarily stored series of images and series of sounds for the set time period in response to activation of the sound photographing mode, and
   storing images and sounds by obtaining for a subsequently set time period.

7. The method of claim 2, wherein the recording the series of images and the series of sounds further comprises recording the series of images at a different time than recording the series of sounds.

8. The method of claim 5, wherein the storing the synthesized particular sound with the particular image further comprises storing photographing information in a header of a data object, the particular image in a body of the data object, and the particular sound in a tail of the data object.

9. An electronic device having a camera, the electronic device comprising:
   an image sensor;
   an image signal processor configured to process an image obtained by the image sensor;
   an audio processing unit configured to process a sound received from a microphone;
   a storage unit configured to store data; and
   a control unit configured to:
   when a sound photographing mode is active, record, for a set period of time, a series of images and a series of sounds using the image sensor and the microphone;
   determine an attribute of a subject by identifying the subject from the series of images;
   select a particular image from the series of images and a particular sound from the series of sounds having a high correlation with the particular image based on the determined attribute of the subject; and
   synthesize the selected particular sound with the selected particular image and store in the storage unit the synthesized particular sound with the particular image.

10. The electronic device of claim 9, wherein the control unit is further configured to:
   select the particular image from the series of images when the sound photographing mode is terminated,
   select the particular sound after selecting the particular image and based on the particular sound having a high correlation with the particular image as determined by comparison and analysis of the series of images and series of sounds, and
   wherein the synthesizing generates a single file in the storage unit by synthesizing the particular image and particular sound into the single file.

11. The electronic device of claim 10, further comprising a display unit, wherein the image signal processor is further configured to:
   resize an image into an image size displayable in the display unit;
   temporarily store the image when output by the image signal processor; and
   convert the temporarily stored image to a thumbnail image,
   wherein the control unit is further configured to:
   display the thumbnail image in the display unit when recording the image and sound is completed,
   select at least one image corresponding to one of the displayed thumbnail image, and
   set the temporarily stored image corresponding to the selected and displayed thumbnail image as the particular image.

12. The electronic device of claim 11, wherein the display of the thumbnail image comprises highlighting a particular thumbnail image from among multiple displayed thumbnail images, based on the particular thumbnail having a focus higher than a focus of other displayed thumbnail images, or capturing a desired movement of a subject compared to the other displayed thumbnail images, as determined by a comparison of the displayed thumbnail images against one other.

13. The electronic device of claim 11, wherein the sound photographing mode is configured to:
   execute for a first time, the first time set to start from a time the sound photographing mode was activated;
   record the series of sounds during the first time; and
   record the series of images during a second time, the first time being longer than the second time.

14. The electronic device of claim 11, wherein the control unit is further configured to:
   temporarily store the series of images and the series of sounds in a buffer in a preview mode,
   store the temporarily stored series of images and series of sounds for the set time period in response to activation of the sound photographing mode, and
   store images and sounds by obtaining for a subsequently set time period.

15. The electronic device of claim 11, wherein the control unit is further configured to record the series of images at a different time than recording the series of sounds.

16. The electronic device of claim 13, wherein the storing the synthesized particular sound with the particular image further comprises storing photographing information in a header of a synthesized file, the particular image in a body of the synthesized file, and the particular sound in a tail of the synthesized file.

17. The electronic device of claim 16, further comprising:
   a communication unit configured to upload the synthesized file under the control of the control unit.

18. The electronic device of claim 9, wherein the high correlation is based on visual recognition of an emotional state of the subject in the particular image which correlates to the particular sound.

* * * * *